United States Patent
Gaignet et al.

(10) Patent No.: US 7,931,810 B2
(45) Date of Patent: Apr. 26, 2011

(54) WATER PURIFICATION SYSTEM AND METHOD

(75) Inventors: Yves Gaignet, Montigny le Bretonneux (FR); Ichiro Kano, Montigny le Bretonneux (FR); Cecilia Regnault, Carrieres Sous Poissy (FR); Daniel Darbouret, Thiers (FR)

(73) Assignee: Millipore Corporation, Billerica, MA (US)

( * ) Notice: Subject to any disclaimer, the term of this patent is extended or adjusted under 35 U.S.C. 154(b) by 281 days.

(21) Appl. No.: 11/656,622

(22) Filed: Jan. 23, 2007

(65) Prior Publication Data
US 2007/0187335 A1 Aug. 16, 2007

(30) Foreign Application Priority Data
Jan. 27, 2006 (FR) .................................... 06 50309

(51) Int. Cl.
*C02F 1/00* (2006.01)
*C02F 9/00* (2006.01)
*B01D 27/00* (2006.01)
*B01D 29/88* (2006.01)
*B01D 35/02* (2006.01)
*E03B 7/07* (2006.01)
*F16L 41/00* (2006.01)

(52) U.S. Cl. .......... 210/739; 210/87; 210/109; 210/117; 210/136; 210/194; 210/258; 210/348; 210/418; 222/52; 222/71; 222/189.06; 222/189.11; 137/561 A; 137/561 R; 137/563; 285/125.1

(58) Field of Classification Search .............. 137/561 A, 137/561 R, 563; 285/125.1; 702/46
See application file for complete search history.

(56) References Cited

U.S. PATENT DOCUMENTS

| | | | | |
|---|---|---|---|---|
| 4,235,677 A | * | 11/1980 | Karamian | 202/176 |
| 4,528,093 A | * | 7/1985 | Winer | 210/96.2 |
| 4,615,799 A | | 10/1986 | Mortensen | |
| 4,759,382 A | | 7/1988 | Harel | 137/564 |
| 4,780,200 A | * | 10/1988 | Bond et al. | 210/194 |
| 4,969,991 A | * | 11/1990 | Valadez | 210/96.2 |
| 5,399,263 A | * | 3/1995 | Chomka et al. | 210/257.1 |
| 5,614,088 A | | 3/1997 | Nagai et al. | |

(Continued)

FOREIGN PATENT DOCUMENTS
CN 1200352 A 12/1998
(Continued)

OTHER PUBLICATIONS
French Search Report dated Sep. 13, 2006.
(Continued)

*Primary Examiner* — Duane Smith
*Assistant Examiner* — Paul J Durand
(74) *Attorney, Agent, or Firm* — Nields, Lemack & Frame, LLC

(57) ABSTRACT

A water purification system and method. A closed water recirculation loop supplied at one point by a water inlet with water to be purified, and having at least one outlet point of use of the purified water. Also included is a pump and a water purifier on the loop respectively downstream of the inlet point and upstream of the at least one outlet point, in the water flow direction. The system includes two independent valves, including a first valve on the loop upstream of the pump and a second valve upstream of the at least one point of use outlet point. The first and second valves are selectively opened and closed to recirculate all the water treated by the purifier.

13 Claims, 3 Drawing Sheets

U.S. PATENT DOCUMENTS

| | | | |
|---|---|---|---|
| 5,935,444 | A | 8/1999 | Johnson et al. |
| 6,235,191 | B1 * | 5/2001 | Nakamura ................... 210/85 |
| 6,349,733 | B1 * | 2/2002 | Smith ............................ 137/1 |
| 6,357,477 | B1 | 3/2002 | Walcott et al. ......... 137/599.15 |
| 6,428,710 | B1 | 8/2002 | Kempen et al. ............. 210/744 |
| 6,475,385 | B1 * | 11/2002 | Boyce et al. ............. 210/257.2 |
| 6,585,885 | B2 * | 7/2003 | Larkner et al. ............... 210/87 |
| 7,793,684 | B2 | 9/2010 | Gaignet et al. |
| 2005/0001046 | A1 | 1/2005 | Laing ........................... 237/19 |
| 2005/0013739 | A1 * | 1/2005 | Dupont et al. ............. 422/68.1 |
| 2005/0126972 | A1 | 6/2005 | Kin et al. .................... 210/192 |
| 2005/0161094 | A1 | 7/2005 | Schmidt ...................... 137/560 |
| 2006/0054222 | A1 | 3/2006 | Goinski ....................... 137/561 |
| 2009/0174185 | A1 * | 7/2009 | Ziu .............................. 285/367 |

FOREIGN PATENT DOCUMENTS

| | | |
|---|---|---|
| DE | 94 06 324 | 4/1994 |
| EP | 1 094 037 | 4/2001 |
| EP | 1 462 581 | 9/2004 |
| JP | 61-160695 A1 | 7/1986 |
| JP | 61-254291 | 11/1986 |
| JP | 63-097284 | 4/1988 |
| JP | 2-144195 | 6/1990 |
| JP | 3-131383 A1 | 6/1991 |
| JP | 5-106748 | 4/1993 |
| JP | 5-329470 | 12/1993 |
| JP | 9-75934 A | 3/1997 |
| JP | 09-253623 | 9/1997 |
| JP | 2000-61462 A | 2/2000 |
| JP | 2003-148749 A1 | 5/2003 |
| WO | 98/52874 | 11/1998 |
| WO | 2004/042220 | 5/2004 |

OTHER PUBLICATIONS

French Search Report dated Sep. 22, 2006.
Office Actions dated May 7, 2009 and Oct. 26, 2009 and Notice of Allowances dated Mar. 12, 2010 and May 13, 2010 in co-pending U.S. Appl. No. 11/656,862.
Millipore BioPak Data Sheet; BioPak Point-of-Use Ultrafilter; No earlier than Mar. 1, 2006; 2-Pages.
Japanese communication dated Sep. 29, 2009 in co-pending application (JP2007-008918).
Japanese communication dated Dec. 8, 2009 in corresponding application (JP-2007-008917).
Singapore Search Report dated Apr. 15, 2010 in co-pending foreign application (2009078767).
European Communication dated Sep. 28, 2010 in co-pending foreign application (10290286.3).
Analytica Chimica Acta 536 (2005) 213-218; Jacobo Otero-Romani, et al.; "Evaluation of commercial C18 cartridges for trace elements solid phase extraction from seawater followed by inductively coupled plasma-optical emission spectrometry determination".
Office Action dated Jun. 14, 2010 in co-pending U.S. Appl. No. 12/587,742.
Barnstead/Thermolyne Brochure; Jun. 22, 2000; "Nanopure Diamond Analytical—Ultrapure Water System Operation Manual Series 1190"; pp. 1-52.
Barnstead/Thermolyne Brochure; Jul. 7, 2000; "Type D11981 Remote Dispenser Operation Manual and Parts List Series 1198"; pp. 1-12.

* cited by examiner

WATER PURIFICATION SYSTEM AND METHOD

The present invention consists in a water purification system. More precisely, the present invention consists in a water purification system of the type equipped with a purified water recirculation loop. The present invention also relates to a water purification method using this system.

Many applications require the use of ultrapure water, in particular in biological and chemical analysis laboratories. Water purification systems have been designed for this purpose.

Depending on the volumes of water that these applications require, the purification systems are required to distribute purified water at their maximum treatment throughput, at a throughput very much less than their maximum treatment capacities, or even sometimes at a nil throughput. Moreover, in some cases, it is necessary to deliver a predetermined volume of purified water, and it is therefore beneficial to be able to automate the distribution of a given volume without the user being obliged to monitor the filling of the given volume. These variations of throughput in this kind of system cause a number of problems, in particular water stagnation problems, which compromise its purity.

The problem is therefore to design a water purification system adapted, as required:

to distribute purified water at a maximum treatment throughput, for example to fill a container as quickly as possible, to distribute purified water at a very low throughput, for example to adjust the water level in a container, and to distribute purified water automatically (volumetric mode) by programming a certain volume of water to be delivered, for example to fill a container, at the same time as providing the best possible water quality regardless of the selected mode of operation and at any time, in particular when water has not been drawn off for some time.

Several solutions to this technical problem have been proposed. They generally provide water purification systems comprising a water recirculation loop fed at one point by an inlet for water to be purified and having at least one purified water point of use outlet, and pumping means and water purification means disposed in the loop respectively downstream (relative to the water circulation direction) of the inlet point and upstream of the at least one outlet point. The recirculation loop design is an effective way to circulate water permanently in the system, avoiding problems linked to stagnation of the water, and enabling the user to obtain purified water at the point of use at any time.

A first prior art type of system of this kind includes a three-way outlet valve that is manually operated to divert water to the outlet point and/or to the recirculation loop. Accordingly, the user can distribute purified water to the point of use either at a high throughput or at a low throughput at the same time as maintaining a constant flow through the water purification means.

This type of valve being manual, it cannot provide an automatic distribution mode for filling a predetermined volume.

Another type of prior art water purification system includes at the outlet a three-way solenoid valve of the on/off type with a normally closed (NC) flow path and a normally open (NO) flow path.

This solenoid valve enables the user to deliver a predetermined volume automatically, although without the possibility of adjusting the distribution throughput.

One solution would entail operation in volumetric mode using an electromagnetically controlled proportional three-way valve. However, this type of valve is costly, bulky and complex. In this case, the volumetric distribution mode imposes a very fast change from the recirculation position to the distribution position of the valve, the response time and the inertia of the valve conditioning the accuracy of the volume delivered.

Moreover, all three-way valves rule out the simultaneous use of two (or more) points of use.

A third type of prior art system includes a distribution pump, a manual two-way valve or a two-way solenoid valve and a spring-loaded check valve in the recirculation loop. This enables the user to distribute purified water at a selected throughput at the same time as maintaining a constant flow in the filter means, unused water being recirculated via the check valve. In this system, in the case of an on/off type solenoid valve solution, the user can distribute a predetermined volume automatically (volumetric mode). In the case of a distribution pump equipped with a variable speed motor, distribution with any throughput is possible but leads to a variation of the flow in the water treatment means. This latter solution therefore caters for a volumetric mode of operation as referred to above. In systems of this type the points of use are equipped with a filter.

The above type of system is described in particular in the document WO98/052874.

The problem with this type of system equipped with a two-way valve and a preloaded check valve is that the head loss induced in the filter at the point of use at the maximum treatment throughput of the treatment means may cause the check valve to open and allow some of the water in the recirculation loop to pass through it, degrading the performance of the system and the volumetric distribution function. Moreover, in this type of system, in recirculation mode, the purified water is recirculated at the calibration pressure of the check valve, which means that the treatment means remain pressurized and a throughput peak occurs when the distribution valve opens.

The invention aims to alleviate these disadvantages.

A first aspect of the invention proposes a water purification system comprising a closed water recirculation loop supplied at one point by a water inlet with water to be purified and having at least one outlet point of use of the purified water and further comprising pumping means and water purification means on the loop respectively downstream of the inlet point and upstream of the at least one outlet point, in the water flow direction, which system is characterized in that it includes two independent valves:

a first valve on the loop upstream of the pumping means, and a second valve upstream of the at least one point of use outlet point.

Thus the present invention proposes to use two two-way valves, with one of them in the recirculation loop, with no additional back-pressure device (for example a preloaded check valve), and the other on the downstream side of the outlet from the treatment means, and used to distribute purified water.

According to preferred features of the invention, which may where applicable be combined:

the two valves are solenoid valves of the type with two normally closed (NC) flow paths;

the system further comprises a control unit for the valves that includes a user interface;

the valve control unit further comprises a memory for saving data supplied by a user;

the water purification system comprises a hydraulic connector forming a distributor or manifold for a hydraulic circuit including a purified fluid inlet and three outlets, the inlet of the connector is connected directly to the first outlet by a pipe and a second pipe is connected hydraulically to the first pipe between said inlet and said first outlet and to a third pipe having two ends forming the other two outlets of the system;

the water purification system comprises two parallel branches that come together downstream of the hydraulic connector;

the two parallel branches are made from thermoplastic materials such as polyethylene, polypropylene or polytetrafluoroethylene.

The invention also relates to a method of using a system of the above kind that comprises the steps of opening the first valve, called recirculation valve, and closing the second valve, called distribution valve, to recirculate all the water treated by the treatment means.

According to preferred features of the invention, which may where applicable be combined, the method further comprises:

the steps of opening the first or recirculation valve and opening the second valve, called distribution valve to distribute purified water at a low throughput;

the steps of closing the first or recirculation valve and opening the second valve, called distribution valve to distribute purified water at a high throughput;

a step of capturing a value for the volume of purified water to be delivered entered by the user on the user interface, a step of storing that value in the memory of the control unit and a step of automatically distributing the entered volume of water, a fast change from a recirculation mode to a distribution mode being obtained by instantaneously opening the distribution valve and closing the recirculation valve.

It is preferable if two two-way on/off type normally closed (NC) solenoid valves are used, as this caters for four state combinations: Open-Open, Open-Closed, Closed-Open, Closed-Closed, each corresponding to a different mode of operation of the system.

This technical solution meets all the requirements for a water purification system mentioned above at the same time as proposing a design that is economic, easy to use and easy to maintain. In particular, it offers operation in the three modes described above.

In the recirculation mode, in which the recirculation valve is open and the distribution valve is closed, water is not distributed by the system, the outlet valve being closed. Consequently, all water leaving the treatment means is recirculated to the treatment means via the recirculation valve.

In the low throughput distribution mode (throughput equivalent or close to a dropwise rate), both valves are open to distribute purified water at a low throughput and to recirculate the remainder in the recirculation loop. The proportion of the water produced that is distributed is a function of the design and the sections of the distribution and recirculation pipes.

In the high throughput distribution mode (throughput equal to the nominal throughput given by the distribution pump), the recirculation valve is closed and the distribution valve is open. Recirculation is no longer possible and all treated water is distributed via the distribution valve.

Finally, the fourth combination of the states of the two valves, with both valves closed simultaneously, yields a fourth mode of operation, namely an idle position mode with the distribution pump stopped and the water treatment unit completely isolated from the points of use.

This mode is used for system maintenance, for example replacing components of the water treatment means.

According to a preferred feature of the invention, which may where applicable be combined with others, the solenoid valve control system may have a volumetric automatic mode for distributing a precise preset quantity of water that successively combines the recirculation mode and then the high throughput mode. In this volumetric mode of operation, a fast change from the recirculation mode to the distribution mode is obtained by instantaneously opening the distribution valve and closing the recirculation valve. This stabilizes the throughput and the quality of the water in the recirculation mode before changing to the volumetric distribution mode, these functions being controlled automatically by the system.

A second aspect of the invention proposes a hydraulic connector that forms a distributor or manifold for a hydraulic circuit of a fluid purification system and has a purified fluid inlet and three outlets, the inlet being connected directly to a first outlet of the three outlets by a pipe and a second pipe being hydraulically connected to the first pipe between said inlet and said first outlet and to a third pipe having two ends forming the other two outlets of the connector.

According to preferred features of the invention, which may where applicable be combined:

the hydraulic connector is a symmetrical pipework component;

the first pipe has an outlet section smaller than its inlet section and the sections of the two outlets of the third pipe are different;

the inlet and outlet sections of the first pipe are substantially equal to respective outlet sections of the third pipe;

the section of the second pipe is less than or equal to the section of the first outlet of the connector.

The invention further relates to a water purification system including a purified water recirculation loop including water treatment means and at least one point of use of purified water, the system being equipped with a connector as described above downstream of the treatment means, the inlet whereof is connected to the outlet of said treatment means and one outlet whereof is connected to the recirculation loop upstream of the treatment means, the system including two parallel branches that come together at the point of use and are connected to the other two outlets of the connector.

The outlet of the device connected to the recirculation loop is preferably an outlet other than said first outlet of the device connected directly to the inlet by said first pipe.

According to an advantageous aspect of the invention, which may where applicable be combined with others, after the outlet of the treatment means, downstream of the connector, the purification system is equipped with two parallel branches that are connected to the recirculation loop at two different points downstream of the water purification means and come together at the inlet of the point of use.

According to a preferred aspect of the invention, the loop advantageously includes a hydraulic connector forming an H-shaped distributor (or manifold) in the recirculation loop for connecting said two parallel diversion branches thereto and ensuring continuity of the recirculation loop via the median portion of the H-shaped distributor.

In this preferred embodiment, the two parallel branches have different functions according to the respective states of the recirculation valve and the distribution valve described above.

Accordingly, in this preferred embodiment of the invention, in the recirculation mode, when the recirculation valve is open and the distribution valve closed, because of the design of the distributor and the resulting relative pressures at the distributor inlet and outlet, the two parallel branches behave like a secondary recirculation loop, preferably with a throughput lower than that of the main recirculation loop. The throughput of the secondary recirculation loop is a function of the geometry of the distributor and of the associated hydraulic circuit.

In the low throughput distribution mode, both valves are open and the two parallel branches behave like a single branch, and each delivers purified water to the point of use. The proportion of water distributed relative to the water recirculated is in part a function of the section of the water pipes and in particular of the geometry of the H-shaped component.

In the high throughput distribution mode, the two parallel branches behave like a single branch and deliver purified water to the point of use.

Providing two parallel branches does not change in any way the overall operation of the system of the invention with two valves in the modes described above.

Note that this preferred embodiment of the invention is not limited to the use of an H-shaped hydraulic connector, and to the contrary covers all variants that will be evident to the person skilled in the art that exploit the design with two parallel branches whereof the principles and advantages are described above.

Moreover, it will be appreciated that the architecture with two parallel branches enables the use of branches each having a diameter smaller than a single branch providing the same throughput as the two branches combined.

Polyethylene (PE), polypropylene (PP) and polytetrafluoroethylene (PTFE) are particularly suitable materials for fabricating pipes for circulating purified water in this type of system. These materials are relatively rigid, however, especially when they take the form of a tube having a large diameter for distributing purified water at a high throughput. In some applications it is beneficial to provide a flexible connection for distributing purified water at the point of use. In this preferred embodiment, the structure with two parallel branches of a system of the invention is exploited by using two parallel branches that are preferably fabricated from PE or PP tubes and are preferably of sufficiently small diameter to impart the required flexibility to them at the same time as being of sufficiently large diameter to allow the distribution of purified water at the maximum throughput via the two branches simultaneously.

Features and advantages of the invention will emerge from the following description of one embodiment of a system of the invention given by way of illustrative and nonlimiting example and with reference to the appended drawings, in which.

Figure 1:
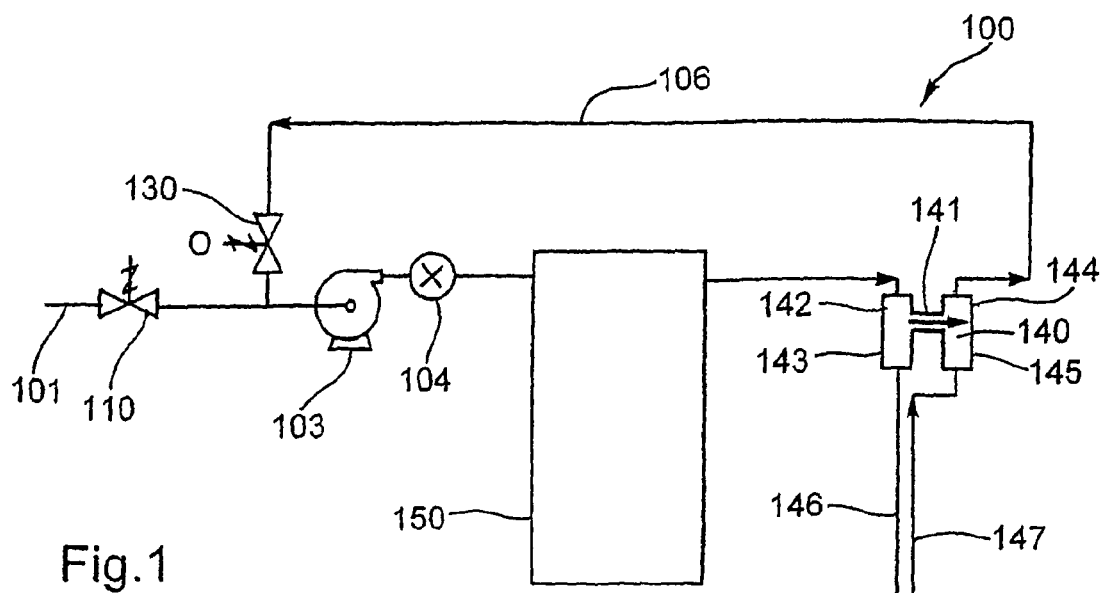
FIG. 1 is a diagram of a preferred embodiment of a system of the invention in a recirculation mode.
Figure 2:
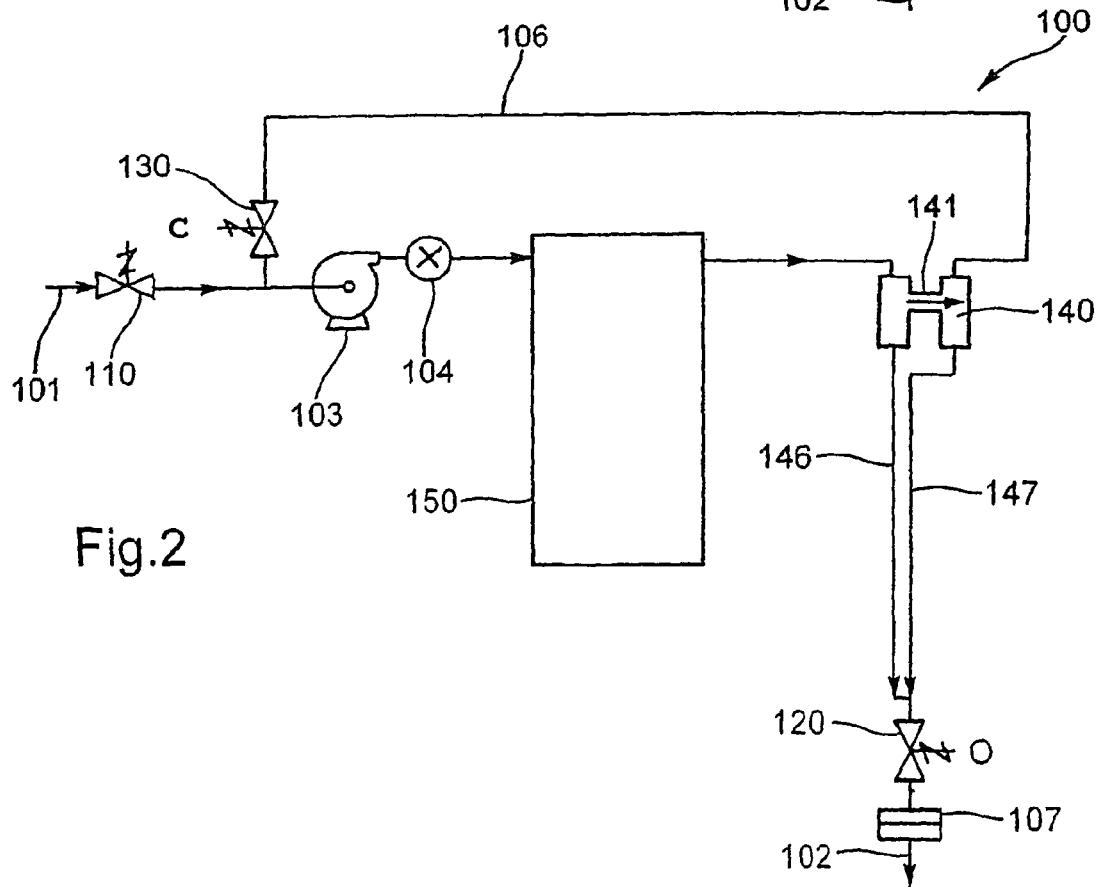
FIG. 2 is a diagram of a preferred embodiment of a system of the invention in a high throughput operating mode.

As seen in FIGS. 1 to 3 in particular, a water purification system 100 of the invention includes a water supply point 101 for supplying the system with water to be purified via a solenoid valve 110 and a recirculation loop 106, a first portion whereof includes a pump 103, a flow meter 104 and treatment means 150 and a second portion whereof includes a distributor or manifold 140 connected at two separate points to said recirculation loop 106, the first connection point being the purified water inlet and the second point being a water outlet connected via the recirculation loop to a recirculation solenoid valve 130, the outlet whereof is connected to the first portion of the system. The distributor 140 further includes two other connection ends respectively connected to two parallel water pipes that come together at their ends opposite the distributor 140 at the inlet of a distribution solenoid valve 120 for distributing purified water to the point of use 102, generally via a filter 107 or a finishing cartridge.

The finishing or polishing cartridge provides a final purification specific to the different uses of the water produced.

For a reduction in the level of pyrogens and nucleases contained in the purified water, an ultrafilter with a cut-off below 13000 daltons is placed in the polishing cartridge.

For a reduction of endocrine disruptors contained in the purified water, specific types of activated carbon are placed in the polishing cartridge. For other applications necessitating a very low concentration of boron or silica or heavy metals or organics disturbing the base-lines in liquid chromatography, specific charged materials (ion exchange resins, charged fibers, synthetic carbons, C18 grafted materials) are placed in the polishing cartridge.

FIG. 1 shows the solenoid valve 130 open and the solenoid valve 120 closed, these positions being symbolized by the letters "O" and "C", respectively. As a result of this configuration of the valves the system operates in the recirculation mode, i.e. purified water is not distributed by the system, and so all the water leaving the treatment means passes through the distributor 140 to rejoin the recirculation solenoid valve 130. In this case, because of the H-shaped design of the distributor 140, the two parallel branches behave as a secondary recirculation loop and a portion of the purified water passing through the distributor 140 is diverted to the parallel branches in order to ensure circulation of water therein, the other portion of the purified water being sent directly to the recirculation loop 106 via a bridge 141 of the distributor 140.

In FIG. 2, the letters "O" and "C" alongside the solenoid valves 120 and 130, respectively, indicate that the system is operating in the high throughput distribution mode. In this case, all the water purified by the treatment means 150 is distributed to the point of use 102 via the solenoid valve 120, the recirculation solenoid valve 130 being closed. In a configuration of the solenoid valves 130 and 120 of this kind, the parallel branches behave like a single branch, the purified water flowing therein in the same direction, as indicated by the arrows in FIG. 2.

Figure 3A:
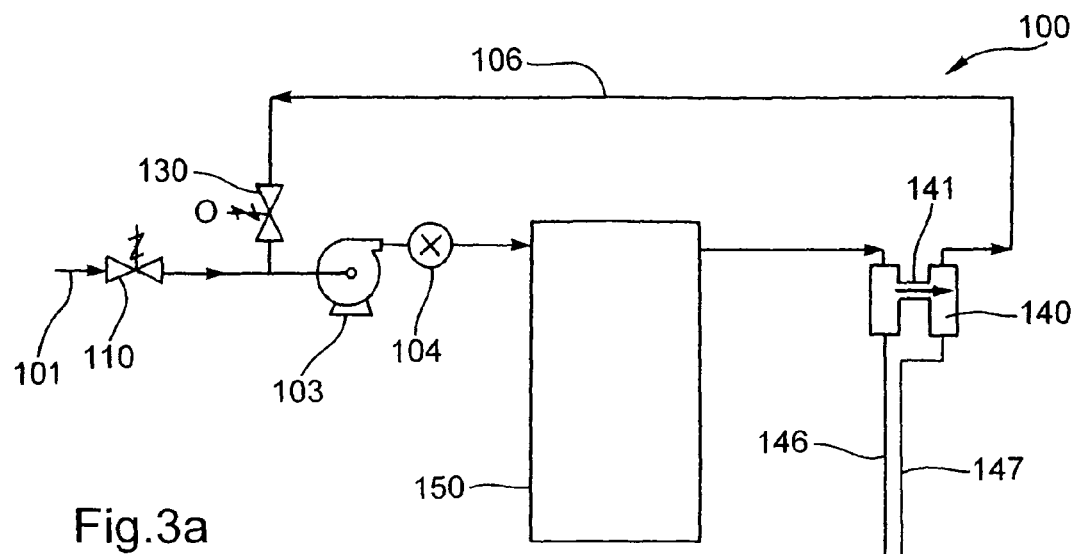
FIG. 3a is a diagram of a preferred embodiment of a system of the invention in a low throughput operating mode.

FIG. 3a shows the same system in a low throughput distribution mode. Accordingly, the recirculation and distribution valves are open, as indicated by the letter "O" in this figure. In this case, the two parallel branches outgoing from the distributor 140 behave like a single branch and deliver purified water to the point of use via the solenoid valve 120, most of the purified water being recirculated directly to the solenoid valve 130 via the loop 106.

Figure 3B:
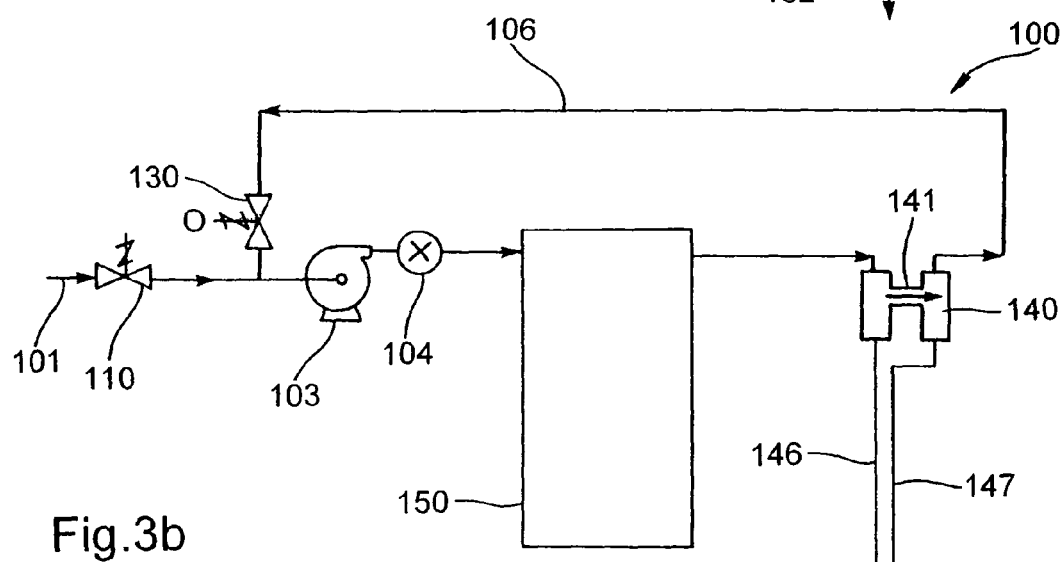
FIG. 3b shows a variant of the FIG. 3a preferred embodiment.

In an alternative embodiment, a spring-loaded check valve 121 is placed between the parallel branches and the distribution solenoid valve 120. An alternative configuration of this kind is shown in FIG. 3b. This kind of check valve reduces the throughput at the point of use in the low throughput mode of operation without degrading the throughput in the other modes of operation.

Figure 4:
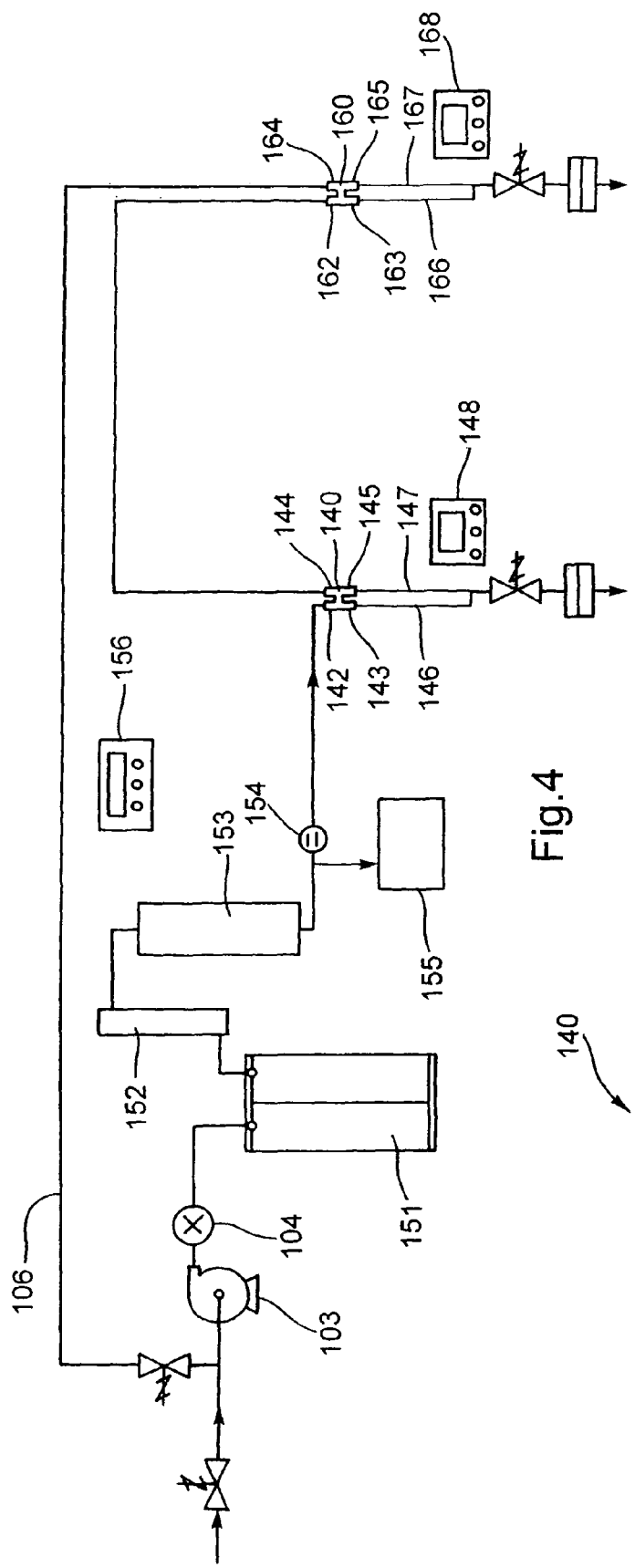
FIG. 4 is a diagram of a variant of the system shown in the preceding figures, indicating the water treatment means.

FIG. 4 is a diagram of a system similar to that represented in FIGS. 1 to 3 in which the water treatment means are indicated. Accordingly, a first portion of the recirculation loop 106 includes a pump 103, a flow meter 104, a pretreatment unit 151, a UV lamp 152, preferably operating at a wavelength of 185 nm, a finishing cartridge 153, and a resistivity cell 154 that is coupled to a total organic content (TOC) sensor 155 and the outlet whereof is connected to the inlet 142 of the distributor 140. The outlet 144 of the distributor 140 is connected in this variant to the inlet of another distributor 160, similar to the distributor 140, and also connected via two parallel branches to a distribution valve for distributing water to a second distribution point having an inlet 162 and three outlets 163, 164 and 165. In other embodiments, using the same architecture but increasing the number of distributors and therefore of points of use may be envisaged. Each point of use may be equipped with a polishing cartridge specific to the different uses of the user. The outlet of the final distributor, here the outlet 164 of the distributor 160, is connected to the recirculation loop 106 on the upstream side of the recirculation solenoid valve 130. Moreover, in this preferred embodiment, each distribution point has a display 148, 168 for showing information relating to the water distributed at each of these points. In an embodiment of this type, if two (or more) users are simultaneously drawing off water at each of the two (or more) points of use, the high throughput mode takes priority and the throughput is distributed to each of the points of use as a function of the head losses.

A valve control unit 156 having a user interface and a memory for saving data supplied by the user controls the operation of the system in the various modes of operation described above, in particular in the volumetric mode of operation.

Figure 5:
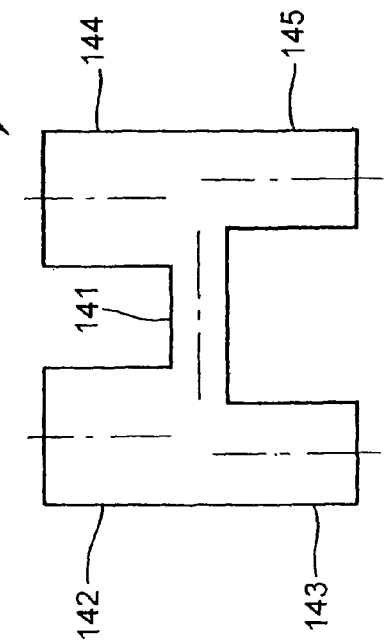
FIG. 5 is a diagram of a hydraulic connector 140 according to the invention forming a distributor or manifold.

FIG. 5 shows a distributor 140 of the invention in section. It comprises two symmetrical T-shaped members connected at their center by a bridge 141. The ends 142, 144 to be connected to the recirculation loop 106 have a larger diameter than the ends 143, 145 that cooperate with the two parallel branches. In a preferred embodiment, the diameter of the bridge 141 is slightly less than the diameter of the ends that cooperate with the two parallel branches. The latter diameter is preferably 6 mm and that of the ends that cooperate with the recirculation loop is preferably 8 mm.

In this preferred embodiment, the two parallel branches consist of PE tubes, preferably with an inside diameter of 4 mm to ensure that they are flexible.

The system of the invention may advantageously have its inlet connected to a tank or to a loop via a pressure regulator in order to reduce the supply pressure from approximately 34.5 kPa to approximately 13.8 kPa.

It goes without saying that many modifications or variants of the system shown and described above will be evident to the person skilled in the art that do not depart from the scope of the invention.

The invention claimed is:

1. Water purification system comprising a closed water recirculation loop supplied at one point by a water inlet with water to be purified, and having at least one outlet point of use of the purified water, a pump and water purification means on the loop respectively downstream of the inlet point and upstream of the at least one outlet point, in the water flow direction, said system including two independent valves on the loop:
    a first two-way normally closed valve on the loop, for recirculation, to provide in the open position, recirculation of water purified by the purification means, via the pumping means, and
    a second two-way normally closed valve for distribution of said at least one outlet point of use and being disposed upstream of said first valve and of the at least one point of use outlet point so as to provide, in the closed position, recirculation of all of the water purified by the purification means towards said first valve;
    said system further comprising a first hydraulic connector comprising four ports that forms a distributor or manifold for said system and is positioned between said first two-way normally closed valve and said second two-way normally closed valve.

2. System according to claim 1, wherein said two valves are solenoid valves of the type with two normally closed (NC) flow paths, wherein one of one of said valves is located in said loop upstream of said pump, and one of said valves is located at said the point of use outlet point connected via said first hydraulic connector.

3. System according to claim 2, further comprising a control unit for the valves that includes a user interface.

4. System according to claim 3, wherein said valve control unit further comprises a memory for saving data supplied by a user.

5. System according to claim 1, wherein a filter or a polishing cartridge is disposed between said second valve and said corresponding outlet point of use.

6. Water purification system according to claim 1, wherein said hydraulic connector comprises a purified fluid inlet and three outlets, the inlet of the connector being connected directly to a first of said three outlets by a first pipe, and a second pipe being connected hydraulically to said first pipe between said inlet and said first outlet and to a third pipe having two ends forming the other two outlets of the connector.

7. Water purification system according to claim 6, further comprising two parallel branches, interconnected by said second pipe creating a secondary loop in recirculation mode and creating a single branch in dispensing mode, that come together downstream of the hydraulic connector.

8. Water purification system according to claim 7, wherein said two parallel branches are made from polyethylene, polypropylene or polytetrafluoroethylene.

9. The water purification system according to claim 6, wherein the diameter of two of said three outlets is less than the diameter of said inlet.

10. The water purification system of claim 1, further comprising a second hydraulic connector comprising four ports that forms a distributor or manifold for said system, wherein one of said ports of said second hydraulic connector is an inlet port in fluid communication with one of said ports of said first hydraulic connector, and one of said ports on said second hydraulic connector is in fluid communication with said recirculation loop.

11. Water purification method including the steps of:
    purifying water using water treatment means,
    providing a hydraulic connector comprising four ports for distributing and recirculating purified water, said four ports comprising a purified fluid inlet and three outlets, the inlet of the connector being connected directly to a first of said three outlets by a first pipe, and a second pipe being connected hydraulically to said first pipe between said inlet and said first outlet and to a third pipe having two ends forming the other two outlets of the connector; and
    circulating the purified water in a recirculation line, wherein it further comprises at least one of the steps of:
    opening a purified water distribution line connecting the recirculation line to a purified water distribution point and opening the purified water recirculation line to obtain distribution at a low throughput, the major portion of the purified water being directly recirculated via said recirculation line;

opening the water distribution line and closing the recirculation line downstream of the water distribution line to obtain high throughput distribution, all the purified water being distributed at the distribution point via the distribution line;

opening the distribution line and closing the recirculation line to obtain the distribution of a predetermined volume of water; or opening the recirculation line and closing the distribution line to obtain a recirculation of all the purified water.

12. The water purification method of claim 11, wherein, for the distribution of a predetermined volume of water, the opening of said distribution line and the closing of said recirculation line are implemented simultaneously.

13. The water purification method of claim 11, further comprising providing a control unit having a memory; entering a value into said control unit for the volume of purified water to be delivered; storing said value in said memory; and automatically distributing the entered volume of water, wherein a change from recirculation mode to distribution mode is carried out by instantaneously opening said distribution valve and closing said recirculation valve before distributing the entered volume of water.

* * * * *